March 1, 1949.  N. D. COGGESHALL ET AL  2,462,946
AUTOMATIC SYSTEM OF PROCESS CONTROL
BY INFRARED SPECTROMETRY
Filed April 11, 1947  5 Sheets-Sheet 2

INVENTORS
NORMAN D. COGGESHALL
MORRIS MUSKAT
BY *A. M. Houghton*
  *their* ATTORNEY

INVENTORS
NORMAN D. COGGESHALL
MORRIS MUSKAT
BY
ATTORNEY

Patented Mar. 1, 1949

2,462,946

UNITED STATES PATENT OFFICE 2,462,946

AUTOMATIC SYSTEM OF PROCESS CONTROL BY INFRARED SPECTROMETRY

Norman D. Coggeshall, Verona, and Morris Muskat, Oakmont, Pa., assignors to Gulf Research & Development Company, Pittsburgh, Pa., a corporation of Delaware Application April 11, 1947, Serial No. 740,828

6 Claims. (Cl. 250—43)

This invention concerns indicating, recording and control apparatus for manufacturing processes. More particularly it involves the use of an infra-red spectrometer as a control apparatus for a chemical process.

In conducting chemical reactions or physicochemical processes, in the manufacture of chemicals or other products, it is customary to run one or more source materials or primary chemicals into a reaction chamber. This chamber may consist of a single vessel, such as a retort, or in more complicated processes, it may be an elaborate assembly of chemical process equipment. In many reactions, the primary chemicals do not react so as to completely combine, but instead reach an equilibrium condition in which the primary chemicals and products formed are in a state of dissociation and recombination so that the desired product is contaminated by either primary chemicals or intermediate compounds. On the other hand there may be practical limitations of conditions, such as temperature and pressure, which arise for instance because of the physical properties of materials of which the reaction chamber is made or because of decomposition reactions which may set in. As a result it is usually desirable to operate a reaction or process at some known optimum set of conditions which give high output together with operating efficiency. In order to maintain the reaction under these optimum conditions, various elements or conditions are brought under control. One may, for instance, control the temperature of a reaction or the pressure, or the amount or character of catalyst, or the relative concentrations of primary chemicals which are used, etc. All of these things will affect the product obtained.

The problem of determining the composition of gaseous products in order to control the producing process is one of major importance in the chemical industry. An analytical determination must be made each time a control adjustment is to be determined. Moreover, such determinations need to be made often upon the products of continuous processes such as isomerization units, alkylation units, and petroleum cracking and distillation units, to determine whether or not they are operating as desired.

Heretofore, for oil refinery processes there has been achieved a certain measure of control by extracting from some point in the process a sample of hydrocarbon gas, transferring this sample in its container to a routine spectrophotometer, measuring the infra-red light absorption at certain preselected wave lengths, calculating the composition of the gas sample from these measurements, and making such changes in the operating conditions of the process as indicated by the composition of the sample. These operations might take of the order of one or two hours and, although somewhat lengthy, they still represent an advantage over previous methods based on analyses by fractional distillation which might require as long as six hours for completion.

The apparatus of this invention makes it possible to carry out the general steps outlined above in a fully automatic and essentially continuous manner. It thus has the advantage that it maintains much closer control of the reaction. The time lapse between the sample withdrawal and the signal analysis and the application of the necessary adjustments to the process operating parameters is only of the order of 30 seconds. A further advantage is that this invention is wholly automatic in that it will function for long periods of time without attention. This has the advantage of eliminating personal errors and in reducing operating costs, as the operators of even routine spectrophotometers must be skilled and experienced.

The apparatus of this invention automatically accomplishes the following sequence of operations: (1) withdrawing a sample of gas from a selected point in the process equipment; (2) automatically taking light transmission values at definite wave lengths; (3) transducing and mixing the transmission values in such a way as to obtain signals representing the various concentrations of the components of the sample; and (4) applying these signals directly or by means of their ratio to govern such operating devices as valves, heater coils, etc. which in turn are effective in controlling the course of the chemical reaction which produced the samples.

It is accordingly an object of this invention to provide apparatus for automatically analyzing the products of a chemical reaction, together with the necessary devices for automatically interpreting these analyses in terms of reaction parameters which may, in turn, be controlled so as to keep the reaction in the optimum condition of operation.

It is another object of this invention to provide means for achieving a substantially continuous analysis in the form of electrical signals which, in turn, may be directed so as to activate and influence control mechanisms affecting the chemical reaction or physical operations giving rise to the gas stream being analyzed.

It is a further object of this invention to provide an apparatus for automatically taking spectroscopic measurements on gaseous products of large scale chemical reactions, and using these measurements to automatically make the desired changes in the operating parameters of the reaction.

It is a still further object of this invention to provide apparatus comprising an infra-red spectrometer in conjunction with an automatic calculating device and a regulating mechanism which responds to signals from the calculating device, to continuously sample the gaseous products from a large scale chemical process, and to utilize the signals representing the concentration ratio of two or more components to control operating parameters of the process.

An explanation of how these objects are attained by this invention may be more clearly understood by referring to the drawings forming a part of this specification, and in which.

This invention contemplates the use of infrared absorption measurements for the purpose of analyzing the gaseous products of a reaction. The infra-red absorption of a gas depends on its molecular structure and therefore often gives information difficult to obtain by other methods, especially when the gaseous components are isomers and therefore chemically very similar.

When light of monochromatic radiation falls upon a substance some of the light is absorbed. The per cent of light absorbed depends upon the compound and upon the wave length of the light. If the light passes through a thickness $d$ of the material, and if the density is such as to provide a concentration $C$, then the relation between the light intensity $I_0$ incident on the layer of material and the intensity $I$ which is transmitted through it is:

$$\text{Log } (I_0/I) = \bar{a} C d$$

where $\bar{a}$ is a physical constant called the "extinction coefficient" and which is known to depend only upon the compound and upon the wave length. This relationship is known as Beer's law, and it is generally followed by most compounds.

For a given wave length the absorbing powers of different pure materials are characterized by numerical differences in the individual extinction coefficients. The extinction coefficients for a particular compound depend upon wave length, and in the infra-red region there will be wave length values for which the extinction coefficient is known to be large compared to other regions. These correspond to the well known infra-red absorption bands.

The quantity log $(I_0/I)$ is designated as the optical density, and may be denoted by D. For a mixture of materials the resulting optical density is known to be an additive function of the contributions of the individual compounds. That is, the optical density for a mixture consisting of a concentration $C_1$ of compound 1 and a concentration $C_2$ of compound 2 will at a definite wave length be given by:

$$D = \bar{a}_1 C_1 d + \bar{a}_2 C_2 d$$

or, if the length $d$ of the adsorption cell is always constant one may combine the extinction coefficients and the length into single constants to get:

$$D = a_1 C_1 + a_2 C_2 \qquad (1)$$

The presence of other compounds will only serve to add additional products of extinction coefficients by concentration on the right-hand side of Equation 1. This equation may serve as a basis for analysis of a mixture of compounds having different values of $a$, provided D is determined for at least as many wave lengths as there are compounds in the mixture.

Thus, for example, in making infra-red analyses of n-butane and isobutane mixtures it is sufficient to determine the optical densities at two wave lengths. The wave lengths which may advantageously be used for this case are: $10.2\mu$ and $8.45\mu$ ($\mu = 10^{-4}$ cm.). At $10.2\mu$ n-butane absorbs strongly and isobutane weakly; at $8.45\mu$ isobutane absorbs strongly. The optical densities, $D_1$ and $D_2$ at these two wave lengths will therefore be:

$$\left.\begin{array}{l} D_1 = a_{11} C_1 + a_{12} C_2 \\ D_2 = a_{21} C_1 + a_{22} C_2 \end{array}\right\} \qquad (2)$$

where $a_{11}$ and $a_{21}$ refer to the extinction coefficients of n-butane for wave lengths 1 and 2 respectively, while $a_{12}$ and $a_{22}$ refer to the extinction coefficients of isobutane for wave lengths 1 and 2 respectively; $C_1$ and $C_2$ being the concentrations of n-butane and isobutane in the sample of gas.

Equations 2 will hold for any concentrations $C_1$ and $C_2$. Also, since the extinction coefficients are numerical constants these equations may be solved to yield:

$$\left.\begin{array}{l} C_1 = A_1 D_1 + B_1 D_2 \\ C_2 = A_2 D_1 + B_2 D_2 \end{array}\right\} \qquad (3)$$

where the $A_1$, $A_2$, $B_1$ and $B_2$ are functions of the extinction coefficients and can be computed by simple algebra.

In essence this invention applies the principles of infra-red spectroscopy to the automatic control of a butane isomerization unit by admitting a sample of the output mixture into an absorption cell, measuring the above-mentioned values of $D_1$ and $D_2$, automatically using these signals in electric circuits which give signals representing $C_1$ and $C_2$, automatically obtaining a ratio between them, and using the resultant signal to control one of the process operating parameters, such as the temperature of the reaction vessel. Application to a butane isomerization process is by way of example only and is not a limitation of our invention, as it may be applied to any process whose products are susceptible of analysis by infra-red absorption measurements.

Figure 1:
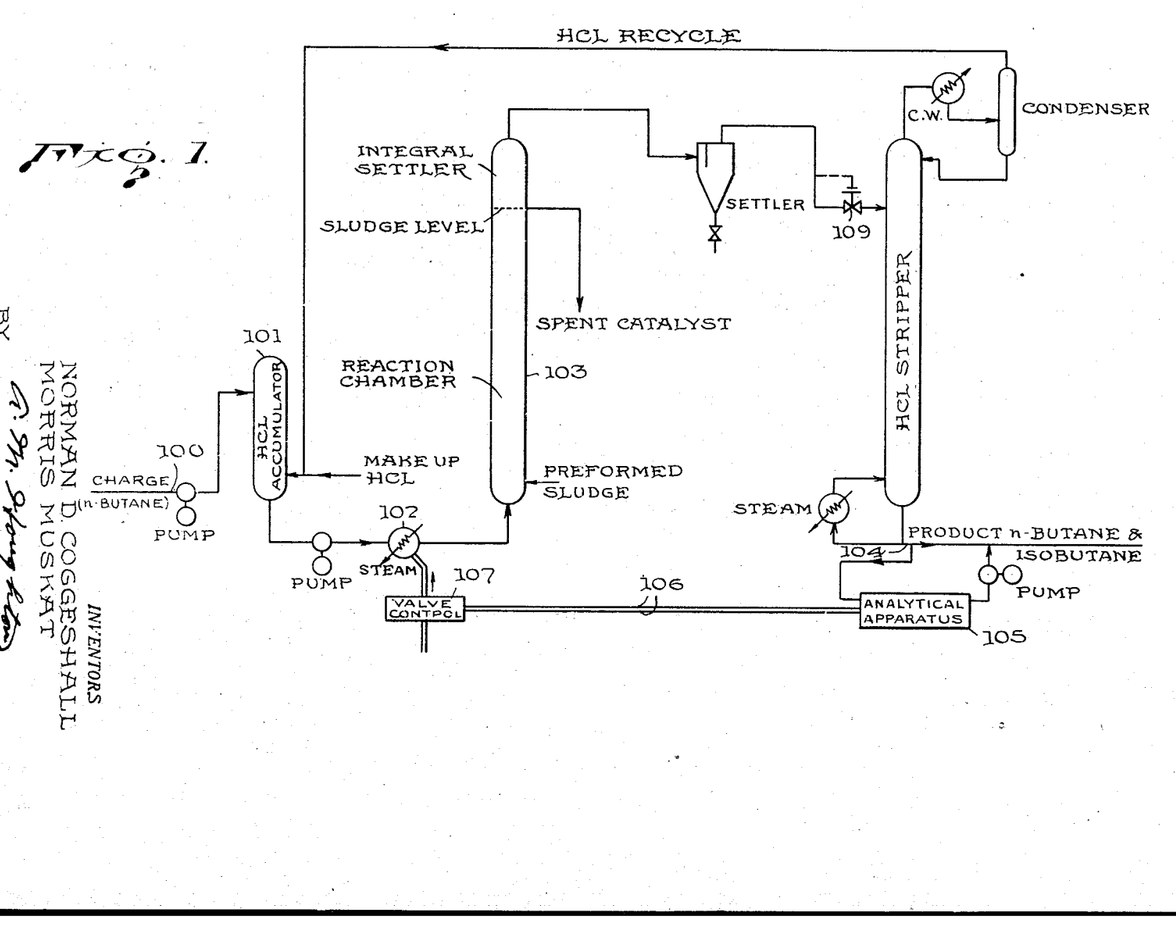
Figure 1 shows the major component parts of a butane isomerization process which we may use as an example of a chemical process into which the apparatus of this invention may be fitted so as to control the reaction.

Figure 1 shows a diagram of a well known butane isomerization unit in which n-butane may be isomerized to isobutane and to which our invention has been applied. Here the n-butane entering the system at 100, is pumped into an HCl accumulator 101 from which the mixture of n-butane and HCl is pumped through a heater 102, and into the reaction vessel 103, where it comes in contact with the catalyst, which may be AlCl₃. In the reaction vessel 103 the n-butane is largely isomerized to isobutane, and the resultant gas goes through a series of stripping operations to remove the catalyst and the HCl before being delivered as a final product. At the point 104 where the product gas, mainly isobutane, leaves the flow system, is installed the analytical apparatus 105 described in this invention. The measurements made by apparatus 105 and the transformation of the resulting signals finally yields an electrical signal in wires 106 which is proportional to the ratio $p_n/p_i$, where $p_n$ is the partial pressure of n-butane in the product stream and $p_i$ is the partial pressure of isobutane. This signal, applied to electric control valve 107, is used to control the steam flow in heater 102 which heats the n-butane as it goes into the reaction vessel. This, in turn, controls the effectiveness of the reaction, so that it is possible to keep the ratio $p_n/p_i$ less than a preselected value or within a pre-selected narrow range of values. The analytical apparatus 105 comprises an infra-red absorption spectrometer whose monochromator is alternately adjusted to two predetermined wave lengths, and automatic computing devices which finally deliver to the wires 106 an electrical signal which is indicative of the chemical analysis of the products obtained at point 104. The various components of the apparatus 105 will be described in detail.

Figures 2, 4:
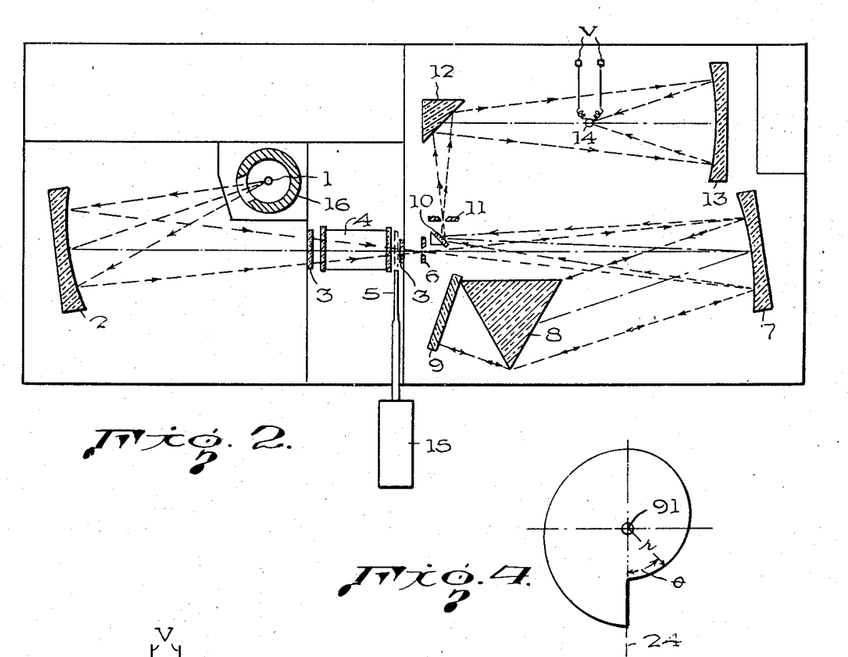
Figure 2 shows the optical diagram of an infrared spectrophotometer which may be used in this invention, also an associated absorption cell and light shutter used to control the passage of radiation through the monochromator.
Figure 4 is a plan view of the logarithmic sector disk which may be used in the apparatus of Figure 3.

In Figure 2 is a diagram showing the essential parts of the optical system of a known type of infra-red absorption spectrometer arranged according to the functional relationship of the parts. Numeral 1 designates the light source which may be an electrically operated Globar heater, 16 is a water jacket to keep the light source from heating up the rest of the apparatus. Numeral 2 is a condenser mirror which focuses the radiation onto entrance slit 6, numeral 3 represents rock salt windows, 4 represents a gas absorption cell with rock salt end plates, and 5 is a shutter which intermittently allows the radiation to pass, as will be explained in more detail later. The windows are of rock salt so as to transmit the infra-red radiation used in the optical system. The shutter 5 is operated by electrical device 15, which may be a solenoid or electric motor.

Slit 6, Figure 2, defines a divergent beam of light (as indicated by arrows) which passes to the collimating mirror 7. This in turn reflects the light as a beam of parallel rays to the rock salt prism 8. The light passes through the prism and is reflected by the mirror 9. All the mirrors are first surface mirrors to eliminate absorption of the radiation. As the different wave lengths of light will be refracted through different angles as the beam passes through the prism 8 to and from mirror 9, there will be a different wave length for every different angle of return from the prism 8. The collimating mirror 7 will intercept only a small angle of the returning light and will focus this nearly monochromatic light onto the mirror 10 in such a way that an image of the slit 6 falls on the plane of the exit slit 11. The wave length of the light falling on the exit slit 11 depends upon the angular position of the mirror 9. In the present application to a n-butane/i-butane isomerization unit the mirror 9 is limited to two positions to allow light of 10.2μ and 8.45μ to pass alternately by a means which will be explained later.

The light passing through slit 11 passes to the mirror 12, from which it passes to the concave mirror 13. This mirror 13 is so located and is of such optical dimensions as to focus the radiation onto 14, which is a well known radiation detector such as a vacuum thermocouple or bolometer or any other suitable radiation measuring device.

Figure 3:
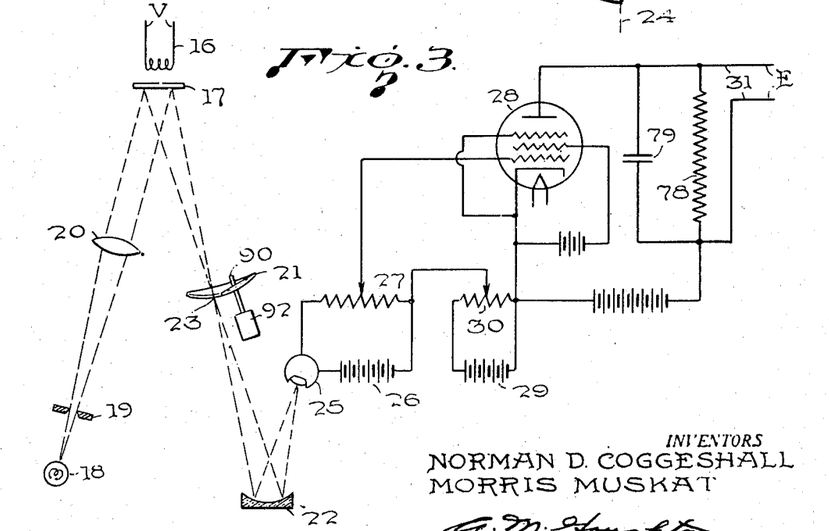
Figure 3 shows a combined optical-electronic device which may be employed to amplify the signals from the monochromator and to extract the logarithm of the resulting signals.

Figure 3 illustrates an apparatus which may be used to derive an electrical signal proportioned to the logarithm of the intensity I of the radiation transmitted to device 14 of Figure 2. It is customary in the art to connect a galvanometer to radiation measuring device 14, the characteristics of these two devices being such that the angular galvanometer deflection is a linear function of the intensity I. Any known combination of radiation detector and galvanometer may be used. Thus, by way of example one may use for device 14 a vacuum thermopile which delivers an electrical voltage V proportional to the intensity I of transmitted radiation, i. e., $I=jV$, $j$ being the proportionality constant. The thermopile 14, Figure 2, is connected to a galvanometer 16, Figure 3, on which it impresses its voltage V. Thus 16 may represent the moving coil of a high sensitivity galvanometer of low internal resistance designed especially for use with thermocouples such that its angular deflection is proportional to the intensity of radiation I striking the device 14 of Figure 2.

The mirror which moves with the galvanometer coil is represented by numeral 17. A small lamp 18 furnishes light passing through the lens 20 and reflected from the galvanometer mirror 17 to form an image of the aperture 19 at a point indicated by 23. This point will move as the galvanometer mirror 17 moves, and it will move on the arc of a circle the center of which is at the axis of rotation of the mirror 17. A logarithmic sector disk 21, shown in a plan in Figure 4, is located on the locus of point 23 and is rotated on a shaft 90. This disk is so constructed that the radius on any point of its periphery has the following relation between the radial distance $r$ from the axis 91, Figure 4, and the angular distance $\theta$ as measured from the base line 24:

$$r=e^\theta \quad \text{or} \quad \theta=\log r \qquad (4)$$

The surface of disk 21 is made slightly concave with its center of curvature at the center of rotation of mirror 17. Therefore, the radial distance used in the Equation 4 is the distance from the center of the disk to a point on the periphery as measured along the concave surface of the disk rather than perpendicular to the axis of rotation of the disk. The smaller radius on the base line 24 is taken as unit distance.

Lamp 18, aperture 19 and lens 20 are mounted rigidly with respect to each other and located so as to obtain a very small, intense spot of light at the point 23. When there is no input signal to the galvanometer, the optical system is so adjusted that the image 23 falls on the disk at a point coincident with the axis of the shaft rotating it. Either the slit widths used, the cell length, the working gas pressure, or the sensitivity of the galvanometer are easily adjusted so that the maximum signal encountered in practice will cause the point of focus 23 to move on the disk to a point which does not exceed its peripheral radius. Also these same parameters are adjusted so that the minimum signal will cause the point 23 to move to a point which always exceeds the minimum radius of the disk. With these conditions Eq. 4 above will be satisfied.

From point 23 the light beam diverges and falls on the surface of the concave mirror 22 from which it is reflected into the photocell 25. The geometry and optics are so arranged that for any position which point 23 may occupy along the curved surface of the disk, a second image will fall on the photosensitive surface of the photocell 25.

Disk 21 is mounted on a shaft 90 through its center point 91 (Figure 4) this being the origin of the spiral $r=e^\theta$, and is driven by motor 92 at a relatively constant speed, say 30 revolutions per second. The interruptions of the light beam caused by rotating disk 21 define a series of illumination pulses in the phototube 25. If the galvanometer 16 receives a signal such as to deflect the point 23 to a radius $r$ as measured along the disk from its axis of rotation, the light will be allowed to pass only for a fraction of the time of the disk's rotation. The fraction of the time during which the beam may pass is $\theta/2\pi$ and during the rest of the time it is cut off by the disk. Thus, the fraction of time during which the photocell 25 is activated depends on the position of the image point 23, which in turn depends on the signal from thermocouple 14, Figure 2. Therefore, since the coordinate $r$ which specifies the deflection of point 23 is proportional to the signal V to the galvanometer:

$$\theta/2\pi = (\tfrac{1}{2}\pi) \log r = (\tfrac{1}{2}\pi) \log V = f \qquad (5)$$

where $f$ represents the fractional time that the signal actuates the photocell. Thus, as the disk rotates at a constant speed, there results a succession of light pulses falling on the phototube, the duration time of each being proportional to the logarithm of the voltage V developed by the thermocouple 14, Figure 2.

The photocell 25, Figure 3, which is supplied voltage by battery 26, causes current pulses to flow in resistance 27 which correspond in time duration to the light pulses it receives. The current pulses in resistance 27 create voltage pulses on the grid of the pentode vacuum tube 28. When no current is flowing in 27, the bias voltage of the tube, coming from the battery and resistance combination 30 is such as to allow no plate current to flow. The battery and resistance combination 26 and 27 are such, however, that when the phototube 25 is activated and current flows in 27 the tube 28 is biased to allow plate current to flow. As a result there will be a series of current pulses to the plate of tube 28 which correspond in frequency and time of duration to the illumination pulses falling on 25. Values for the resistance 78 and the condenser 79 are chosen so that the time constant of the combination is long compared to the period of rotation of disk 21. The resulting steady voltage E which is developed across leads 31 is proportional to the fractional time of duration of the illumination pulses, and the voltage E across leads 31 is therefore proportional to the logarithm of the voltage V applied to the galvanometer by the thermocouple, i. e., $$E = K \log V \qquad (6)$$

where K is a constant of proportionality.

Figure 5:
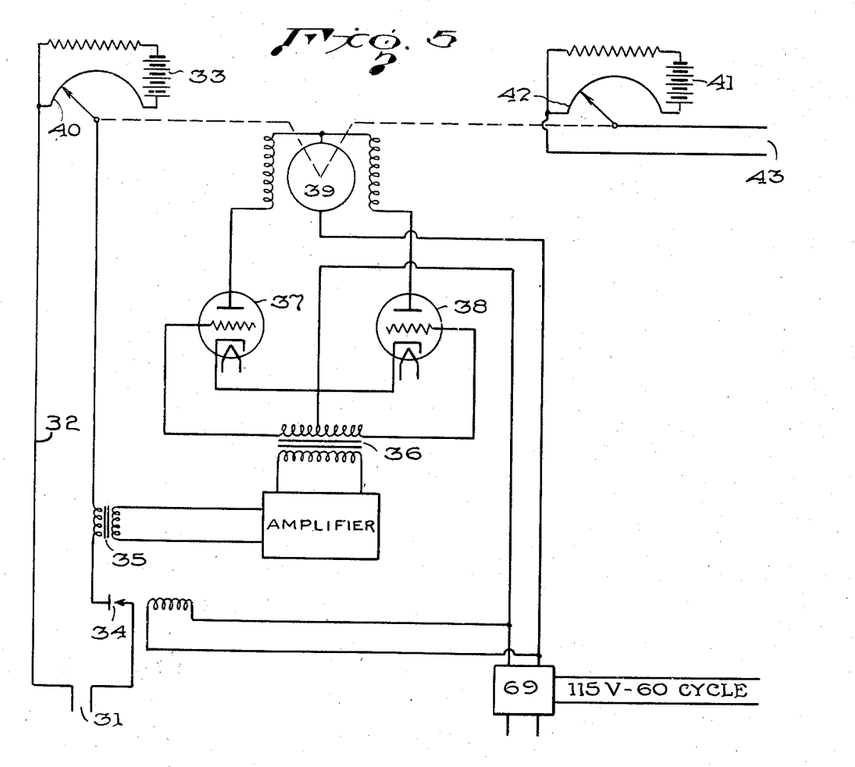
Figure 5 is a schematic diagram of a type of electronic potentiometer which may be used in our invention.

The signal E is conducted to the leads 31 of the electronic potentiometer shown in Figure 5. The latter is of a type well known in the art, and employs a voltage from battery 33 to buck out or oppose the D.-C. voltage on leads 31. A vibrator or interrupter 34 creates an A.-C. signal in the transformer 35 when current flows in leads 32 due to lack of balance of the voltages. The A.-C. signal from the secondary of transformer 35 is amplified and goes into the primary of transformer 36. The center tapped secondary of 36 feeds the grids of two thyratrons 37 and 38. The plate voltage on these tubes is supplied from the same A.-C. source as drives the vibrator, and since the grid signals will be out of phase with each other one tube or the other will pass current depending upon the direction of the current in the primary of 35. As one tube conducts while the other does not, this results in current flowing in only one side of the split field balancing motor 39. Mechanically coupled to the armature of 39 is the moving contact of the variable potentiometer 40. The movement of the armature 39 is such that it causes movement of the contact on 40 in a direction required to restore equilibrium. The signal coming in on leads 31 is opposed by the voltage picked off on potentiometer 40, and when the two voltages are balanced there is no signal to the thyratron grids and the motor does not turn.

An additional battery and variable resistance arrangement 41 and 42 are mounted with the movable contact mechanically coupled to the motor 39 in the same manner as 40. This added circuit gives a voltage signal on leads 43 which is equal to the voltage signal coming in on leads 31. The circuit of leads 43 is electrically isolated from the input circuit of leads 31. Also, as will be seen later, the current to the motor 39 is only turned on for a certain portion of a definite time cycle during which a balance is obtained. After the balance is obtained the current to the field coils of the motor is shut off for the remainder of the time cycle. However, during this idle period the signal remains unchanged on leads 43 and it is during this time that the signal is utilized, as will be explained below.

Figure 6:
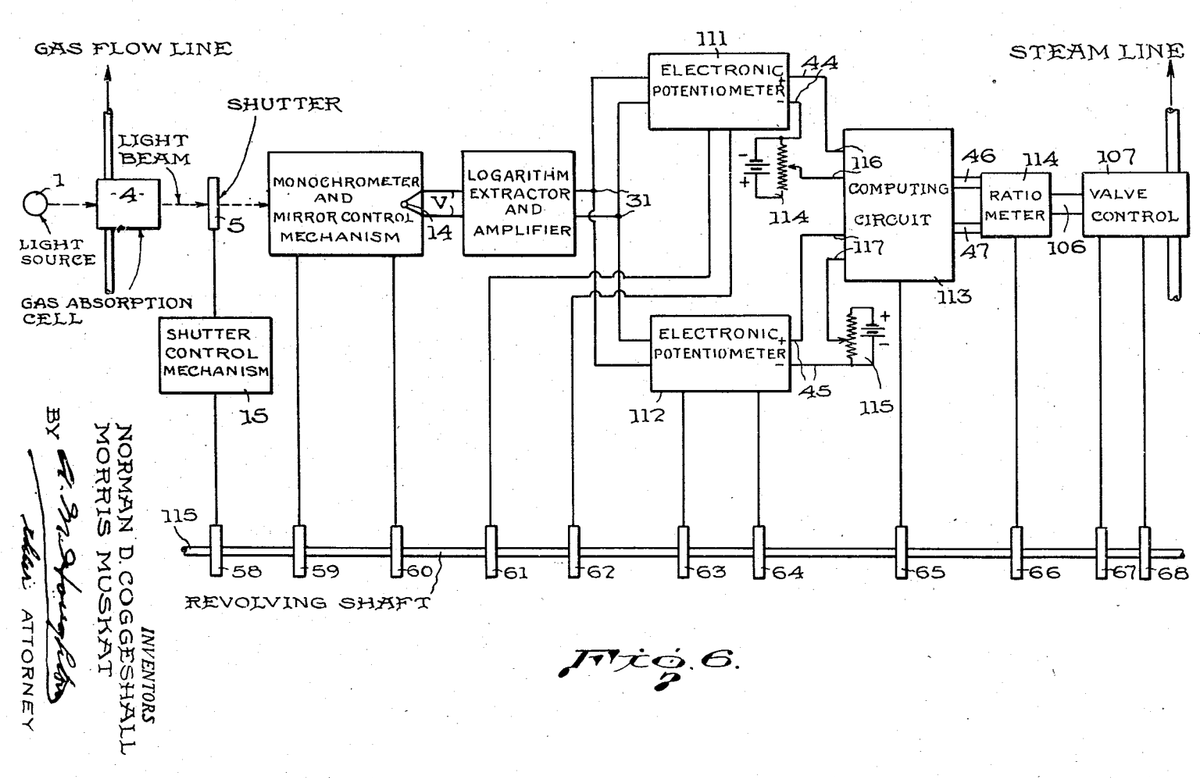
Figure 6 is a block diagram showing the main operating components of our invention.

One may now refer to Figure 6, which is a schematic block diagram indicating the principal components of the analytical apparatus designated on Figure 1 by numeral 105. Numerals on Figure 6 which are common to those used on the more detailed figures designate corresponding components. A source of radiation 1 causes a beam of infra-red light to pass through the gas absorption cell 4 at which point it may or may not be intercepted by the shutter 5. If not intercepted, it goes into the monochromator part of the spectrophotometer and generates a voltage signal V on the thermocouple 14, the intensity of which is proportional to the amount of light getting through the cell. This signal V is transmitted via wires to the logarithm extractor and amplifier previously described as Figure 4. From wires 31, a signal E, which is proportional to the logarithm of the transmitted light intensity, goes to one of two electronic potentiometers 111 and 112 each similar to that shown in Figure 5.

Now with the wave length controlling mirror 9, of Figure 2, set to admit light of wave length $\lambda_1$ (=10.2$\mu$) the signal is sent to the electronic potentiometer 111 of Figure 6. This device receives its signal on leads 81, corresponding to leads 31 of Figures 3 and 5. The sequence of automatic operations is so arranged that the current driving the motor 39, Figure 5, is cut off before the input signal on leads 31 is cut off and this leaves the signal on output leads 43 of Figure 5 or 44 of Figure 6. This effectively amounts to the device 111 maintaining the signal obtained for $\lambda_1$. The apparatus then goes through a sequence which positions the mirror 9 to admit light of wave length $\lambda_2$ (=8.45$\mu$) to the thermocouple, with a resulting signal to the logarithm extractor and amplifier. This latter signal from the amplifier is fed to the electronic potentiometer 112 of Figure 6, which is the same in every respect as 111. It also operates in the same manner, and after a certain point in the sequence of events, potentiometers 111 and 112 will in effect each be delivering signals which are representative of the logarithms of the original signals to the thermocouple. These signals are delivered through the leads 44 and 45 of Figure 6, to potentiometers 114 and 115 respectively and into a computing circuit 113.

To aid in understanding the function of the computing circuit 113 of Figure 6, it is convenient to return to some of the original equations, namely:

$$C_1 = A_1 D_1 + B_1 D_2 \atop C_2 = A_2 D_1 + B_2 D_2 \} \quad (3)$$

and $$E = K \log V \quad (6)$$

where V is proportional to the intensity of light falling on the thermocouple.

Let $I_1$ be the intensity of light falling on the thermocouple when light of wave length $\lambda_1$ is admitted to it, and $I_2$ that for light of wave length $\lambda_2$. These two quantities will be the light intensities when there is an actual sample in the absorption cell. If the cell is evacuated the signals for the two wave lengths will represent the intensities of the light source, which may be denoted by $I_{01}$ and $I_{02}$.

From the definition of the optical density:

$$D_1 = \log (I_{01}/I_1) = \log I_{01} - \log I_1$$

and $$D_2 = \log (I_{02}/I_2) = \log I_{02} - \log I_2$$

Also since $I = jV$, and using Equation 6 we may write:

$$D_1 = M_1 - \log V_1 \text{ or } D_1 = M_1 - E_1/K$$

wherein $M_1$ is a constant depending upon the magnitude of $I_{01}$ and upon other proportionality constants, and $E_1$ is the voltage signal for $\lambda_1$ delivered by electronic potentiometer 111, Figure 6, on wires 44.

By a similar derivation, one may show that:

$$D_2 = M_2 - E_2/K$$

where $E_2$ is the voltage signal for $\lambda_2$ delivered by electronic potentiometer 112, Figure 6, on wires 45. We therefore have the equation:

$$KD_1 = KM_1 - E_1 \atop KD_2 = KM_2 - E_2 \} \quad (7)$$

In order to obtain signals $KD_1$ and $KD_2$ it is necessary to properly combine $E_1$ and $E_2$ with constant voltages $KM_1$ and $KM_2$. The latter may be obtained through the use of simple voltage divider circuits, such as 114 and 115, Figure 6, each connected in series with the voltages from 44 and 45, so that the voltages on lines 116 and 117 represent the right hand side of Equations 7, equivalent to $KD_1$ and $KD_2$, respectively. The constant voltages $KM_1$ and $KM_2$, which depend on $I_{01}$ and $I_{02}$ as well as other apparatus parameters may be determined beforehand and potentiometers 114 and 115 may be set before the system is put in operation.

Having thus obtained voltages proportional to $D_1$ and $D_2$, the interpretation of these electrical signals obtained in wires 116 and 117 involves the solution of a system of linear, simultaneous, algebraic equations such as the Equations 3 in the present example. Several such devices are known, one being described by R. R. M. Mallock, Proc. Royal Soc. A 140, 457 (1933). Another has been described by J. R. Bowman in U. S. patent application Serial No. 479,790. Circuit 113, Figure 6, may be such a device.

Figure 7:
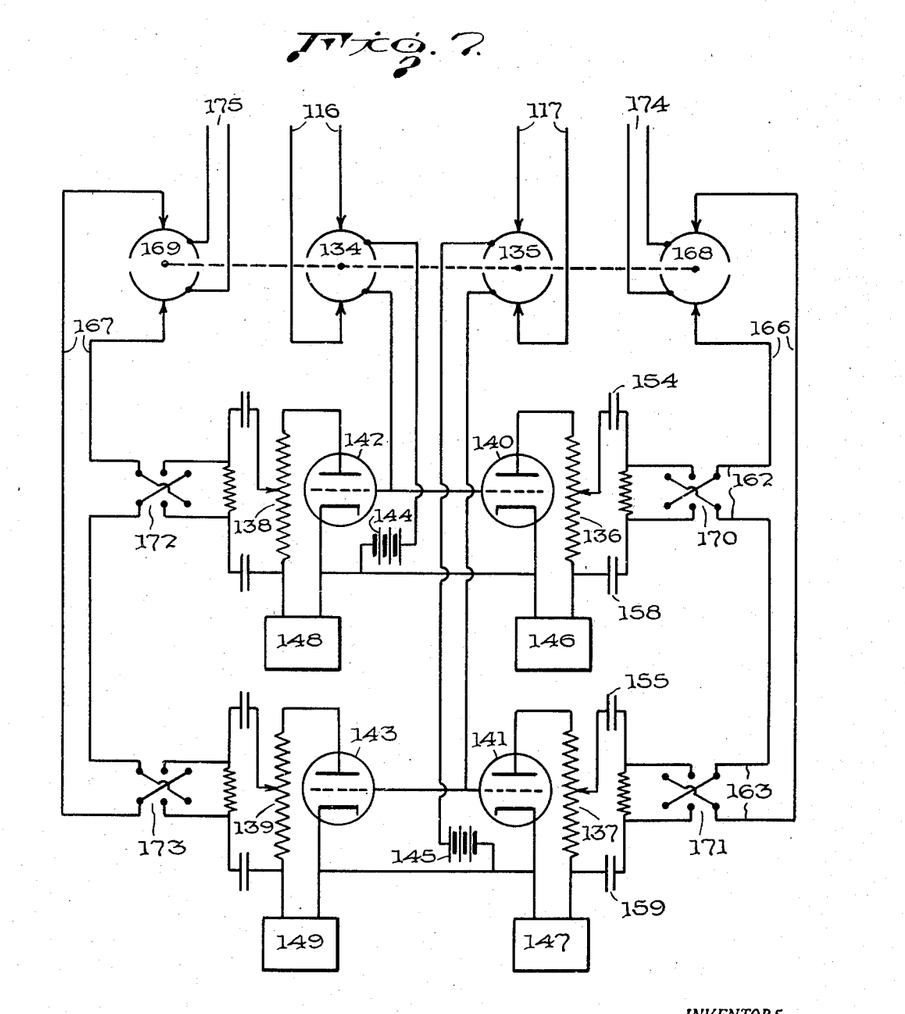
Figure 7 is a schematic diagram of one type of computing circuit which may be used to resolve signals which determine the concentration of the various components of the process product.

For the simple case described here by way of example, wherein only two electrical signals are obtained from the infra-red absorption spectrometer, a means of solving the two simultaneous equations by combining the electrical quantities so as to obtain the concentrations of n-butane and i-butane is shown in Figure 7. Here 116 and 117 represent the leads bringing in the D.-C. voltage signals representing $KD_1$ and $KD_2$ respectively. Split ring commutators 134 and 135 run synchronously at about 3000 R. P. M. and convert these voltage signals into two A.-C. voltage signals which are in phase with each other. These A.-C. voltage signals will also be proportional to the quantities $D_1$ and $D_2$. Denoting the voltage from wires 116 by $V_{g1}$ and that from wires 117 by $V_{g2}$, we may write $V_{g1} = hD_1$ and $V_{g2} = hD_2$ where $h$ is the proportionality constant. These voltages are each fed into two tubes whose outputs are made proportional to the $A_1$, $B_1$, $A_2$, $B_2$ and combined in accordance with Equations 3 to yield the solutions of these equations.

In Figure 7 the filament circuits are conventional and not shown, while 146, 147, 148, 149 represent plate supply devices isolated from each other. The signal from commutator 134 is added to the steady grid bias from battery 144 and applied to the grid of tubes 140 and 142. The plate current of tube 140 will depend on the voltage of battery 144 and of the voltage supply 146, and there will be an A.-C. component which depends on the magnitude of $V_{g1}$. By means of condensers 154 and 158 the D.-C. component of plate voltage is blocked out. The A.-C. component may be adjusted to the appropriate value proportional to $A_1$ by means of the sliding contact on resistance 136. Thus leads 162 will carry an A.-C. voltage which may be adjusted to be equal to the quantity $(A_1 D_1)$. Similarly the A.-C. voltage on the grid of tube 141 coming from commutator 135 will be $V_{g2} = hD_2$ and the plate output of tube 141 may be adjusted equal to the quantity $(B_1 D_2)$. The D.-C. component of the output from tube 141 is blocked out by means of condensers 155 and 159. Thus the A.-C. voltages in leads 162 and 163 are seen to represent the two quantities on the right-hand side of Equation 3 and furthermore they are in phase. The addition may be made by simply connecting them in series so that wires 166 carry an A.-C. voltage equal to $A_1 D_1 + B_1 D_2$ and therefore equal to $C_1$. Thus the electrical signal in wires 166 is indicative of the concentration $C_2$ of n-butane in the product stream and therefore equal to $hp_n$ where $h$ is a proportionality constant and $p_n$ is the partial pressure of n-butane. Similarly, the signals coming from commutators 134 and 135 are impressed on tubes 142 and 143 respectively. Output from these tubes is made proportional to $A_2$ and $B_2$ by an adjustment of potentiometers 138 and 139 respectively. Wires 167 are in this way made to deliver an A.-C. signal equal to $A_2D_1+B_2D_2$ and therefore indicative of $C_2$ and equal to $hp_1$. From the wires 166 and 167 the values of $p_n$ and $p_i$ are easily obtained directly if desired. Reversing switches 170, 171, 172 and 173 are provided to take care of the algebraic sign of the quantities $A_1$, $B_1$, $A_2$, $B_2$.

If the voltage representing $p_n$ and $p_i$ are desired to be D.-C. instead of A.-C. they may be rectified by means of synchronous commutators 168 and 169. Thus wires 116 and 117 carry into the device of Figure 7 respectively D.-C. voltages proportional to the logarithm of the spectrometer signal at wave length $\lambda_1$ and at wave length $\lambda_2$, while wires 174 and 175 deliver D.-C. voltages proportional to the components n-butane and i-butane present in the gas stream being analyzed. These currents are essentially continuous signals which may be recorded or used for desirable control purposes as indicated generally in Figure 1.

While we have shown in Figure 7 a circuit for obtaining an analysis of a two-component mixture, this circuit may be expanded to analyze systems of more than two components. Thus for three components the input signals (wires 116 and 117) would each be fed into three tubes. For three components, measurement would be made at three wave lengths and there would be three signals. Thus a total of nine tubes would be required. The output of each tube may be adjusted to a value proportional to the appropriate one of the coefficients of Equations 3. These coefficients may be computed algebraically beforehand.

Another device which may be used instead of Figure 7 to perform the mathematical computation in the analysis of a complex mixture is the computing device disclosed by John R. Bowman in U. S. patent application Serial No. 479,790. Inasmuch as this machine operates on D.-C., no commutators such as are indicated by 134, 135, 168 and 169 in Figure 7 would be required.

For some processes the ratio or other function of the concentration of certain components is more desirable than the concentration values themselves. If the product of the concentrations is desired the voltages from wires 174 and 175 may be multiplied and indicated, for example, by means of a wattmeter. A device suitable for obtaining the quotient of the voltages in wires 174 and 175 is one such as described in U. S. Patent 2,129,880 granted to S. A. Sherbatskoy and J. Neufeld. Another device for obtaining the ratio of these voltages is the "Megger." This device indicates the ratio directly and may be used as a relay. Still another type is one very similar to the electronic potentiometer shown in Figure 5. In the modification of the apparatus of Figure 5 for purposes of a ratio meter the signal $hp_1$ would come in on leads 31 and the battery 33 would be replaced by the leads conducting voltage signal $hp_2$. The function of the rest of the apparatus would be the same, and the signal across leads 43 would be proportional to the ratio $p_1/p_2$.

Returning to Figure 6 and our present example of a butane isomerization unit, the ratio $p_n/p_i$ or $p_i/p_n$ may be used to keep the process operating within a pre-chosen range of values of the i-butantane and n-butane percentages. Therefore electrical voltages equal to $hp_1$ and $hp_2$ are delivered from the computing circuit 113 on leads 46 and 47 to a ratio meter 114. From the ratio meter the signal representing $p_n/p_i$ may be transmitted on leads 106, Figures 1 and 6, to the valve control 107 on the steam line of the isomerization process.

The proper functioning of our invention depends upon the operation of the various components of the apparatus described above in a predetermined sequence with controlled time intervals. The timing is controlled by the constant speed revolving shaft 115 shown in Figure 6. On this shaft may be mounted a number of contactors 58—68 which make and break electrical circuits at the required phases in the time cycle. Instead of shaft 115 with contact disks one may use a program motor in which cams operate electrical contacts. These devices are well known in the art, and the shaft 115 with contactor 58—68 is merely a diagrammatic representation of such a device. The arrangement of the conducting portions of the contactors is such as to make operable the sequence described. A contactor may make two or more contacts per cycle, so that its solenoid for example may be activated during more than one portion of the cycle. Contactor 58 controls the movement of the shutter shown as 5 in Figure 2. Contactor 59 controls the operations of the slits 6 and 11. Contactor 60 controls the positioning mirror 9 as will be shown later. Contactor 61 controls contact switches which admit or shut off the signals to the electronic potentiometer 111. The power supply to the follow-up motor 39 is controlled by the contactor 62 which acts to turn it off or on by means of the relay 69, Figure 5. Contactor 63 controls the signals to electronic potentiometer 112 and 64 controls its motor supply current. The contactor 65 controls the entry of signals into the computing circuit. The portion of the time cycle during which signals from the mixing circuit are admitted to the ratio meter is controlled by 66, while 67 controls the input of signals from the ratio meter to the valve control, and 68 controls the valve positioning motor.

Figure 8:
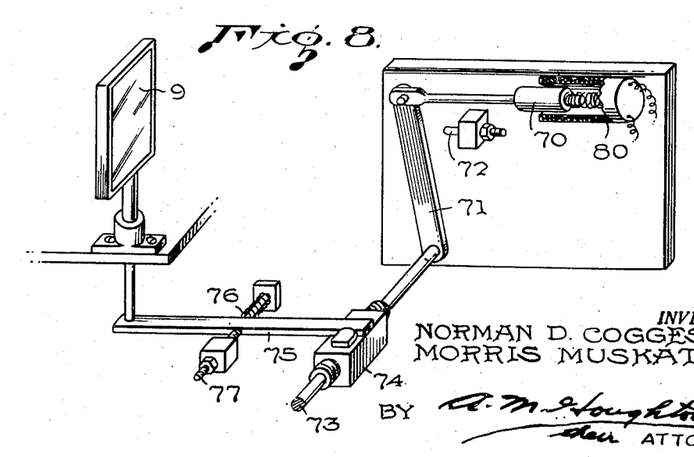
Figure 8 shows a type of mechanism which may be used to position the wave length controlling mirror in the monochromator.

Figure 8 shows an apparatus which may be used to position the wave length controlling mirror 9. The angular position of mirror 9 determines the wave length at which measurements are being made, and a means of precise setting is required. Here 80 is a solenoid, the flow of current through which is controlled by disk 60. When current flows in it, the iron cylinder 70 is pulled to the right. The movement to the right is terminated when the bar 71 contacts the positioning screw 72. The movement of 71 turns the shaft 73 which has a threaded section engaging the threaded interior of block 74. The direction of the threads are such as to move the block forward, i. e. toward the bar 71 when the cylinder 70 moves to the right. When bar 74 moves forward to its final position the mirror 9 is positioned properly to admit light of wave length $\lambda_1$ to the thermocouple. When the solenoid 80 is deactivated block 74 moves back until it no longer contacts bar 75. The spring 76 pushes bar 75 back until it encounters the positioning screw 77. The angular position of the mirror is then such as to admit light of wave length $\lambda_2$ to the thermocouple.

To describe the complete sequence of operations, one may begin with the initial state in which gas is in the cell, the shutter is withdrawn to allow light to pass into the monochromator, the slits are set for light of $\lambda_1$, the mirror is positioned for light of $\lambda_1$, the signal from the logarithm extractor is feeding into electronic potentiometer 111, and the motor in it is activated, other switches being open. This state is maintained for several seconds to insure equilibrium so that the signal on leads 31 represents the logarithm of the intensity of the signal to the thermocouple.

Next the power to the motor of electronic potentiometer 111 is cut off, which isolates and holds the signal on leads 44. The shutter is then allowed to intercept the light beam and the slits change to the position for light of wave length $\lambda_2$, and the mirror 9 takes the position to allow light of wave length $\lambda_2$ to reach the thermocouple. The signal from the logarithm extractor is then switched to electronic potentiometer 112 and its motor is activated. The shutter is withdrawn and a state analogous to the first is developed. This continues for several seconds to allow equilibrium to be reached and for leads 45 to carry the proper voltage representing the logarithm of the light intensity to $\lambda_2$. The motor of electronic potentiometer 112 is then shut off isolating this voltage.

Next the signals on leads 44 and 45 are switched into the computing circuit 113 and a time of the order of a fraction of a second is allowed to elapse for equilibrium to be established, and then the output signals representing $p_n$ and $p_i$ and switched into the ratio meter. After a period of the order of two or three seconds or less, during which the ratio meter can balance itself, the resulting signal representing $p_n/p_i$ is switched into the valve control mechanism. This may be of any of the standard types well known in the art. A control to hold the valve position in one setting until the entire apparatus goes through its sequence of events is provided by the control contactor 68. Such step by step operation of the control valve will also tend to prevent hunting of the control system.

During the operation of the components 113, 114 and 107 the slits and positioning mirror in the monochromator resume the positions for $\lambda_1$, and the necessary electrical contacts are made so that when the current is cut off in the valve control mechanism 107, the system is in the original state, i. e. ready to determine signals for $\lambda_1$ again.

The valve control may be any one of several known in the art. It may be a solenoid valve or a motor driven valve, or in the case of more complicated control it may be a program motor (cf.; "Industrial Instruments for Measurements and Control" by T. J. Rhodes; McGraw-Hill). The valve control mechanism may be adjusted so that when the $p_n/p_i$ ratio as expressed by the signal from the computer rises above a certain predetermined value the rate of flow of steam into the heat exchanger is increased. This will raise the temperature in the reaction vessel 103 with a subsequent drop in the $p_n/p_i$ ratio. If it is desired to keep the value of $p_n/p_i$ within certain limits, the valve control mechanism may be so adjusted that the rate of flow of steam will be lowered when $p_n/p_i$ goes below a certain predetermined value. In this manner the automatic control valve will function within a predetermined range of values of $p_n/p_i$ in the output.

The valve 109, Figure 1, shown as a pressure regulated valve, may alternatively also be of a controlled type appropriately connected to the control mechanism so as to hold the pressure at a value best suited to the range of $p_n/p_i$ desired and compatible with the safe operating pressure of the system.

The gas in the absorption cell 4, Figure 2, may be kept flowing continuously or a changing mechanism may be used which will change the gas in the cell for each new repetition of the operation sequence. This changing mechanism may be controlled by an additional contactor added to the revolving shaft 115, and may be comprised of inlet and outlet valves which are open for a sufficiently long time during each cycle to allow a complete flushing and replacement of the gas in the cell.

The complete sequence of control operation takes less than one minute. With the steam controlling valve thus being reset or at least checked in position once every minute, the result is effectively equivalent to continuous sampling and control of the process.

The width of the slits 6 and 11 in Figure 2 may be changed with each wave length or may alternatively be kept constant. If it is desired to change the slit width for each wave length a controlling device similar to that shown in Figure 8 may be used. Other known alternatives in the construction and operation of various components of the apparatus may be used without departing from the scope of our invention. For example, a Nernst glower may be used instead of a Globar heater as the radiation source.

We have described in detail the apparatus of our invention as applied to systems of two components but it is not thereby to be restricted to such simple systems. An obvious extension in the number of component working parts will make the apparatus suitable for mixtures of more than two compounds. For such a system the number of positions of the wave length controlling mirror would be increased, the number of electronic potentiometers would be increased and the scope of the computing circuit would be increased.

While we have further described our invention as applied to a particular chemical process, this is for illustrative and descriptive purposes only and our invention is not limited thereto. An infra-red spectrometer and computing device as automatic controlling means for any chemical or physical process is contemplated within the scope of this invention. An infra-red spectrometer and such associated devices as described herein may also be used for partial control as supplementary to other known control means, and such supplementary apparatus is regarded as also within the scope of this invention. Moreover, this invention is not to be construed as applying only to the type of infra-red spectrometer shown but to any kind which operates at a multiplicity of wavelengths. The apparatus is not limited to obtaining a single ratio of two components, but may be applied where it is desired to obtain and control several concentration ratios or individual concentrations in the product, and with knowledge available about how the operating conditions affect these ratios, the signals representing these ratios or concentrations may be utilized to control the operating conditions of any process or any part thereof. The concentration ratios or individual component concentrations may be recorded if desired by the addition of well known electric recorders to the output of the computing circuit, Figure 7, or its equivalent. Such a recorded record will serve to monitor the operation of the automatic control comprising our invention and will give a permanent record of its action.

What we claim as our invention is:

1. A device for controlling an oil refinery process in which a product containing a plurality of final compounds are produced, comprising a source of infra-red radiation, a gas absorption cell disposed in the path of said radiation and adapted to receive a sample of the product, electrically actuated means for controlling at least one of the process operating parameters, monochromator means disposed in the path of radiation transmitted through said absorption cell and adapted to alternately separate from said transmitted radiation and direct upon said radiation detector rays of two wavelengths, each representative of one of said final compounds as present in the product, whereby successive pulses of electric energy proportional to the intensities of said wavelengths of transmitted radiation are produced, means for transforming said pulses of electrical energy into successive first electrical signals the magnitudes of which are proportional to the logarithms of their respective pulses produced by said radiation detector, and thus to the logarithm of the transmitted radiation intensity, a plurality of electronic potentiometers for receiving each of said electrical signals and including automatic isolated follow-up means for retaining the indicated magnitudes of said electrical signals for a predetermined time interval, computing circuit means for receiving simultaneously the indicated magnitudes of said electrical signals from said potentiometers and for solving a system of linear, simultaneous algebraic equations relating said magnitudes to the concentrations of compounds in the product, in such manner as to obtain electrical signals proportional to the respective concentrations of the said compounds in the said product, and means responsive to at least one of said concentration signals for actuating said operating parameter control means.

2. A device for controlling an oil refinery process in which a product containing a plurality of final compounds is produced, comprising a source of infra-red radiation, a gas absorption cell disposed in the path of said radiation and adapted to receive a sample of the product, electrically actuated means for controlling at least one of the process operating parameters, monochromator means disposed in the path of radiation transmitted through said absorption cell and adapted to successively separate from said transmitted radiation and direct upon said radiation detector rays of a plurality of wavelenghts, each representative of a component of said product, whereby successive pulses of electric energy proportional to the intensities of said wavelengths of transmitted radiation are produced, means for transforming said pulses of electrical energy into successive first electrical signals the magnitudes of which are proportional to the lagarithms of their respective pulses produced by the said radiation detector and thus to the logarithms of the transmitted radiation intensity, a plurality of electronic potentiometers each adapted to receive one of said electrical signals and including automatic isolated follow-up means for retaining the indicated magnitudes of said electrical signals during a predetermined time interval, computing circuit means for receiving simultaneously the indicated magnitudes of said electrical signals from said follow-up means and for solving a system of linear, simultaneous, algebraic equations relating said magnitudes to the concentration of said components in said product in such manner as to obtain electrical signals proportional to the respective concentrations of the said components in said product, means for obtaining electrical signals proportional to the ratio of the concentrations of at least two selected components, and means responsive to said ratio signals for actuating said operating parameter control means.

3. A device for controlling an oil refinery process in which a product is produced which contains a plurality of final compounds, comprising a source of infra-red radiation, an absorption cell disposed in the path of said radiation and adapted to receive a sample of said product, means for measuring the optical density of the sample to said radiation for a plurality of wavelengths corresponding in number to the number of final compounds in the product, and corresponding in their respective wavelengths to values for which the extinction coefficient for each individual final compound is large compared to other regions, means for automatically transforming said optical density measurements into first electrical signals representative thereof, means for automatically using these first electrical signals in electric circuits which give second signals representative of the concentrations of each of said final compounds in the product, means for automatically obtaining in the form of a third signal a ratio between any selected second signals, and means for using the resultant third signal to control one of the process operating parameters.

4. A device for controlling an oil refinery process in which a product is produced which contains a plurality of compounds, comprising a source of infra-red radiation, an absorption cell disposed in the path of said radiation and adapted to receive a sample of said product, means for measuring the optical density of the sample to said radiation for each of a plurality of wavelengths corresponding in number to the number of compounds in the product, and corresponding in their respective wavelengths to values for which the extinction coefficient for each individual compound is large compared to other regions, means for automatically transforming said optical density measurements into first electrical signals representative thereof, means for automatically using these first electrical signals in electric circuits which give second signals representative of the partial pressures of each of said compounds in the product, means for automatically obtaining in the form of a third signal a ratio between any selected second signals, and means for using the resultant third signal to control at least one of the process operating parameters.

5. The combination of a source of infra-red radiation, a monochromator disposed in the path of said radiation, a radiation detector adapted to receive radiation from said monochromator and to transform said radiation into electrical currents, means for amplifying the currents, means for conducting a sample of a refinery product into the path of the radiation between the infra-red source and the monochromator, whereby only the radiation transmitted through the product is received by the monochromator, said monochromator having means for causing first and second monochromated bands of transmitted radiation to strike said radiation detector successively, whereby they are transformed into successive first and second electrical currents proportional to the intensity of the transmitted radiation bands from which they are derived, means for transforming said first and second currents into successive beams of visible light the time duration of which is proportional to the logarithm of the intensity of the transmitted radiation bands from which they are derived, an electric circuit including a photocell disposed in the path of said beams of visible light and an electronic amplifier whereby said beams of light are transformed into an electrical signal proportioned to the logarithm of the intensity of the said transmitted radiation bands, a plurality of electronic potentiometers each adapted to receive one of said last-mentioned electrical signal and including automatic isolated follow-up means for retaining the indicated magnitudes of said electrical signals during a predetermined time interval, computing circuit means receiving simultaneously said electrical signals from said follow-up means and electrically transducing said signals in accordance with a system of linear, simultaneous algebraic equations relating the logarithm of the intensity of the transmitted radiation bands represented by said last-named signals with the concentrations of components in the product sample, in such manner as to deliver electrical signals proportional to the respective concentrations of the components in said product, means for obtaining in the form of final electrical signals the ratios of the signals representing the concentrations of any selected components of the product, and means responsive to the magnitudes of said final signals for actuating means for controlling at least one of the operating parameters of a process for producing the said refinery product sample.

6. In a spectrograph of the type in which infra-red radiation from a source is passed through an absorption cell containing a product including a plurality of compounds and then through a monochromator having an exit slit and containing a prism and a pivotable mirror for directing through said exit slit any pre-selected band of infra-red radiation and upon a radiation detector, the combination with said mirror of a shaft for supporting said mirror for rotation about an axis lying intermediate its ends, a pivotal support for said shaft, a crank secured at its proximal end to said shaft, a block engaging said crank at a point removed from its proximal end, and having a threaded bore, a rod threadedly engaging said bore, a second crank secured upon said rod for turning the same, a solenoid having a plunger for turning said second crank, whereby the mirror is moved through an arc to a final position, and spring means operative upon de-energization of the said solenoid, for returning said second crank to initial position, whereby said mirror is moved through an arc to its initial position, and whereby transmitted radiation of a plurality of wavelengths may be successively directed upon said radiation detector upon appropriate movement of the mirror.

NORMAN D. COGGESHALL.
MORRIS MUSKAT.

REFERENCES CITED

The following references are of record in the file of this patent:

UNITED STATES PATENTS

| Number | Name | Date |
|---|---|---|
| 1,746,525 | Darrah | Feb. 11, 1930 |
| 2,063,140 | Allison | Dec. 8, 1936 |
| 2,176,013 | Pineo | Oct. 10, 1939 |
| 2,314,800 | Pineo | Mar. 23, 1943 |
| 2,376,311 | Hood | May 15, 1945 |
| 2,386,831 | Wright | Oct. 16, 1945 |
| 2,404,064 | Heigl et al. | July 16, 1946 |